United States Patent [19]

Wareham

[11] 4,016,582
[45] Apr. 5, 1977

[54] PHOTOGRAPHIC SYSTEM ACCOMMODATING INDEPENDENT INSERTION AND REMOVAL OF BATTERY AND FILM ASSEMBLAGES

[75] Inventor: Richard R. Wareham, Marblehead, Mass.

[73] Assignee: Polaroid Corporation, Cambridge, Mass.

[22] Filed: June 9, 1975

[21] Appl. No.: 584,989

[52] U.S. Cl. .............................. 354/275; 354/83; 354/173; 429/123
[51] Int. Cl.² ................... G03B 17/26; H01M 2/02
[58] Field of Search .............. 354/83, 85, 86, 174, 354/173, 275, 283, 288; 96/76 C; 136/111, 166

[56] References Cited
UNITED STATES PATENTS

| | | |
|---|---|---|
| 3,561,339 | 2/1971 | Erlichman ....................... 354/174 |
| 3,643,571 | 2/1972 | Erlichman et al. ............... 354/174 |
| 3,798,669 | 3/1974 | Bachelder ...................... 354/85 X |
| 3,833,427 | 9/1974 | Land et al. .................... 136/166 X |
| 3,870,566 | 3/1975 | Bergum et al. ................. 136/111 |
| 3,874,875 | 4/1975 | Land .............................. 96/76 C |
| 3,877,045 | 4/1975 | Bloom et al. .................. 354/174 X |

*Primary Examiner*—Edna M. O'Connor
*Attorney, Agent, or Firm*—Edward S. Roman

[57] ABSTRACT

A photographic system of the type having a chamber therein for receipt of a film assemblage and battery assemblage wherein the film assemblage rests in juxtaposition with respect to the battery assemblage upon full insertion thereof. When a film assemblage is expended, it may be withdrawn and replaced independently of the battery assemblage. Each battery assemblage may thereafter be removed and replaced upon depletion of its reserve power.

17 Claims, 6 Drawing Figures

FIG. 3

PHOTOGRAPHIC SYSTEM ACCOMMODATING INDEPENDENT INSERTION AND REMOVAL OF BATTERY AND FILM ASSEMBLAGES

BACKGROUND OF THE INVENTION

1. Field of the Invention

This invention relates generally to a photographic system of the type accommodating ready insertion of a thin flat battery assemblage and a thin, flat film assemblage and more particularly to a photographic apparatus of the type accommodating ready insertion and replacement of a flat, thin film assemblage while also facilitating selective removal and replacement of a flat, thin battery assembly subsequent to the utilization of a predetermined number of film assemblages.

2. Description of the Prior Art

Compact and light weight fully automatic photographic systems capable of producing a waste free photographic print of the self-developing type have recently been introduced to the mass consumer market. An example of such a photographic apparatus is disclosed in U.S. Pat. No. 3,714,879 entitled "Reflex Camera" issued to Edwin H. Land et. al. on Feb. 6, 1973. This patent shows and describes a fully automatic, single lens, reflex camera capable of being folded into a thin, compact shape suitable for convenient carrying in the pocket of a garment. In addition, the camera is intended for use with a disposable film cassette of a type including an integrated power supply therein. Such a cassette is described in considerably more detail in U.S. Pat. Nos. 3,543,662, issued Dec. 1, 1970; 3,651,746, issued Mar. 28, 1972; and 3,705,542, issued Dec. 12, 1972. These patents describe photographic film cassettes which include a plurality of film units, preferably of the self-developing type, arranged in stacked relation and adapted to be exposed and then withdrawn from the cassette and processed. Also included as an integral part of the cassette is a battery or power supply for operating the components of the camera in which the film units are exposed and processed. The function of the battery is to supply the electrical power requirements to various camera subsystems whose function corresponds closely to those steps in the photographic process that would normally be performed by the system user. Such subsystems include, for example, the exposure control system, film transport system, and a motor powered mechanism for processing the exposed film unit. The battery additionally supplies power to logic circuits within the camera that function to control its sequential operation. In a case where the user is taking a flash picture, the battery additionally supplies the power necessary to ignite the flashbulb or, alternatively, to charge a strobe unit used for artificial lighting.

Batteries of this type incorporated in such film cassettes are required to have a power-delivery capacity sufficient to meet the power requirements of the camera under the worst foreseeable conditions. Such conditions would occur in the case where all pictures taken were flash pictures. Under this condition, as with others, the power would also have to be sufficient to supply the energy necessary to assure that the film would be transported through the processing system at some minimum speed which would insure proper coverage of the exposed film unit by a processing fluid contained with the film unit itself. In order to assure these power drain requirements are fully met, batteries have been designed to have an excess power-delivery potential even under the worse case conditions. However, because of the integral nature of the cassette design which incorporates both the film units and the battery therewithin, the cassette would normally be discarded once all of the film units have been used. This means that the excess or residual electrical power left in the battery would be irretrievably wasted.

To overcome this disadvantage, it has been recently suggested that means be provided in the design of the film cassette which would allow the user to easily remove the battery from the film cassette so that its residual energy could again be utilized. An example of such a film cassette arrangement is fully disclosed in a U.S. Pat. Application Ser. No. 485,795, now abandoned, entitled "Cassette With Battery Insertion/Removal Means", by Nicholas Gold, filed July 5, 1974. The batteries may be recycled for use with a number of film cassettes and since the battery represents a major portion of the cost of the film cassette, the overall cost effectiveness of the system can be dramatically improved to make the system more attractive for a potential buyer as a result of the per unit cost reduction realized by distributing the cost of a battery over a number of film cassettes. In addition, the cost of each film cassette can be individually reduced if sold without a battery.

In addition, this type of film cassette can be purchased and used with a camera system of the type not requiring the battery for its operation. Such a camera might be similar to the one shown and described in U.S. Pat. No. 3,757,657 entitled "Manually Operable Film-Advancing Apparatus" issued to V. K. Eloranta, et. al. on Sept. 11, 1973. The flexibility of having a single film cassette which may be universally used with either a manually operable or electrically powered camera system is therefore most desirable.

However, a measure of inconvenience may arise as a result of the fact that the battery still remains insertable with respect to the film cassette so as to be withdrawn with the film cassette each time a film cassette is removed and replaced. Thus, upon the withdrawal of an expended film cassette, the battery must also be removed therefrom and reinserted into a new film cassette prior to its insertion within the camera. In addition, there remains the risk that a photographer will inadvertently forget to remove the battery from a used film cassette prior to discarding the film cassette, in which case the reserve power of the battery would also be irretrievably lost.

Therefore it is a primary object of this invention to provide a photographic system wherein a battery assemblage may be selectively removed and replaced independently of a film assemblage.

It is another object of this invention to provide a photographic system which can accommodate either conventional film cassettes of the type embodying boty film units and a battery or separate film assemblages and battery assemblages which may be inserted and withdrawn independently of each other.

It is a further object of this invention to provide a photographic system of the type wherein a photographic film assemblage may be inserted into juxtaposition with respect to a battery assemblage and thereafter withdrawn from such juxtaposition without withdrawing the battery assemblage.

Other objects of the invention will in part be obvious and will in part appear hereinafter. The invention accordingly comprises the mechanism and system processing the construction, combination of elements and arrangement of parts which are exemplified in the following detailed disclosure.

SUMMARY OF THE INVENTION

The present invention relates to a photographic apparatus of the type requiring a source of electrical energy for operation thereof and having a chamber therein defining an exposure plane. The chamber is also adapted for receipt of a film assemblage, and additionally includes electrical contacts for connecting to the source of electrical energy upon the insertion thereof into the chamber. The improvement comprises a film assemblage having opposed outside major surfaces adapted for receipt within the film receiving chamber in a manner whereby at least one outside major surface of the film assemblage is guided into substantial coincidence with respect to the exposure plane. In addition, the film assemblage is readily withdrawable from the chamber in a direction approximately parallel to the major surfaces. A source of electrical energy of the type having opposed outside major surfaces is adapted for stationing within the film receiving chamber in electrically conductive relation with respect to the electrical contacts therein. One outside major surface of the energy source nests in substantial juxtaposition with respect to the other major surface of the film assemblage subsequent to the insertion of the film assemblage and energy source within the chamber. Means are also provide for inhibiting withdrawal of the energy source from the chamber and any direction approximately parallel to the outside major surfaces of the energy source without first moving the energy source a predetermined source without first moving this energy source a predetermined distance in a direction substantially transverse to the outside major surfaces of the energy source. Thus, withdrawing the film assemblage from the chamber may be accomplished without simultaneously removing the energy wherein the energy source may be selectively removed from the chamber subsequent to the removal of the film assemblage.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENT

The present invention is depicted in its preferred embodiment as being incorporated in a compact collapsible camera of the type which uses self-developing film, although the present invention may be used with other types of electrically powered cameras. The camera herein illustrated embodying the features of this invention generally conforms to the camera structure disclosed and described in considerable detail in U.S. Pat. No. 3,714,879 entitled "Reflex Camera" by Edwin H. Land, et. al., issued on Feb. 6, 1973. This patent shows and describes a fully automatic single lens reflex camera capable of being unfolded into a thin, compact shape suitable for convenient carrying in the pocket of a garment and has the capability of automatically exposing and processing film units of the self-developing type.

Figures 1, 2:
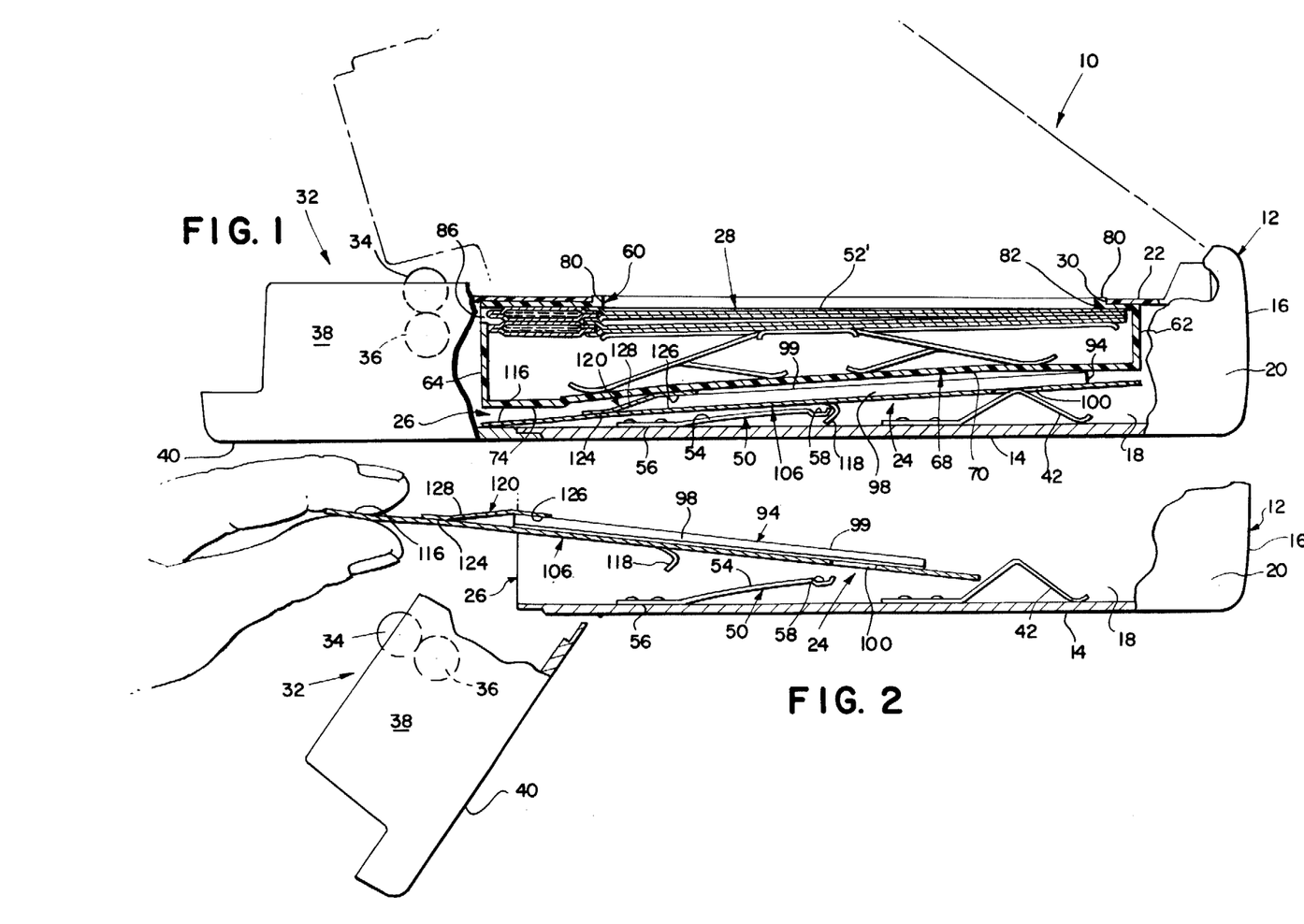
FIG. 1 is a side view, partly in cross-section, of a portion of a photographic apparatus containing the film and battery assemblages of this invention.
FIG. 2 is a side view, partly in cross-section, of a portion of the photographic apparatus of FIG. 1 with the battery assemblage in an intermediate position of insertion or withdrawal.

Referring now to FIG. 1, there is shown a camera 10 including a main housing section 12 having a base wall 14, an end wall 16, and side walls 18 and 20. Walls 14, 16, 18, and 20 cooperate with a plate 22 to define a chamber 24 having an open end 26 through which a film assemblage 28 and battery assemblage 94 may be inserted in a manner to be subsequently described in greater detail. Plate 22 includes a rectangular shaped exposure opening 30 therein which opening generally defines the film exposure plane for the camera 10. A roller housing section 32 is mounted adjacent to the open end 26 of the chamber 24 and includes suitable means for mounting a pair of rollers 34 and 36 between side walls 38 [only one of which is shown] and above a rear wall 40. Housing section 32 is pivotally coupled with respect to housing section 12 to accommodate movement of the rollers 34 and 36 between a film processing position and a film and battery assemblage loading position. Rollers 34 and 36 when in the processing position can receive therebetween an exposed film unit 52 as it exits from the film assemblage 28. The housing section 32 may be moved into the loading position by pivotally displacing it in a counterclockwise direction relative to the housing section 12 as shown in FIG. 2, so that the rollers 34 and 36 unblock the open end 26 of the chamber 24. Thus, the film assemblage 28 and the battery assemblage 94 may be inserted into or withdrawn from the chamber 24 by way of the unobstructed path thus provided.

A pair of laterally spaced apart electrical contacts 42 are mounted within the chamber 24 and upon the base wall 14 in order to make electrical contact with the battery assemblage 94 to provide the requisite electrical energy for powering the various components to the camera 10 when the film is exposed and processed. A resilient projecting support member 50 is also mounted within the chamber 24 and provides a biasing force which continuously urges a properly inserted film assemblage 28 and battery assemblage 94 toward the plate 22. Member 50 may be a resilient cantilevered member formed on a suitable flexible material such as spring steel and including a root section 56 rigidly mounted to base wall 14, a cammed surface section 54 and a generally U-shaped trap section 58 located at the end of the section 54. Section 54 extends into the chamber 24 in a direction away from the base wall 14 and toward the plate 22 so as to contact the battery assemblage 94 upon the insertion thereof into the chamber 24.

Figure 3:
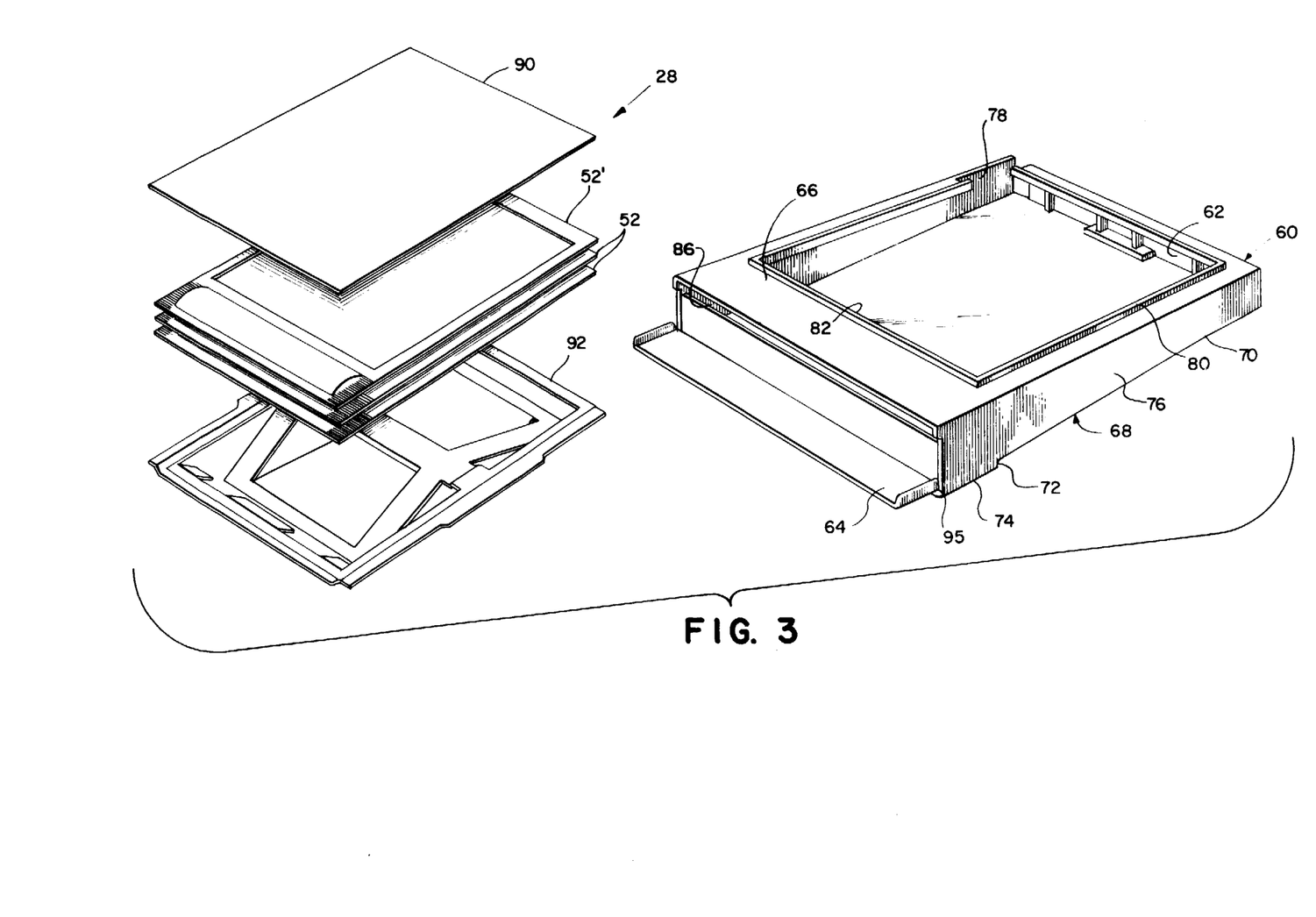
FIG. 3 is an exploded perspective view of the film assemblage of this invention.

Referring now to FIG. 3, there is shown in substantial detail an exploded view of a generally flat film assemblage or cassette 28 comprising a housing member 60 for containing a plurality of film units 52 arranged in stacked relationship with the uppermost film unit shown at 52'. The film assemblage housing member 60 approximates a parallepipedon formed by spaced apart substantially parallel front and rear wall members 62 and 64, top and bottom wall members 66 and 68 which respectively generally define a top major surface and a bottom major surface, and spaced apart side wall members 76 and 78. The bottom wall member 68 preferably includes a leading section 70 and trailing section 74 in substantially parallel spaced apart relation with respect to each other and interconnected by a obliquely angled intermediate section 72. In this manner, the leading section 70 is indented or recessed with respect to the trailing section 74 so as to define a recessed portion underlying the film assemblage 28. As is readily apparent, the bottom wall 68 and its associated leading and trailing sections 70 and 74 are also slightly skewed with respect to the top wall member 66 to define a slightly tapered film assemblage 28 between the front wall member 62 and the slightly wider rear wall member 64.

The top wall member 66 includes a rectangular shaped light transmitting exposure aperture 82 therethrough together with an endless rib or flange 80 extending upwardly therefrom around the peripheral edge of the exposure aperture 82. The rear wall member 64 of the film assemblage 28 also defines a film exit slot 86 through which an exposed film unit 52 may be advanced by appropriate means. In addition, there may be provided a thin upper hinged section (not shown) which provides a light seal across the film exit slot 86 until the film assemblage 28 is inserted within the film receiving chamber 24. Upon insertion of the film assemblage 28 within the chamber 24, the upper hinged section is engaged by appropriate structure (also not shown) within the camera apparatus 10 so as to be moved out of its light blocking position across the exit slot 86 in a manner as is fully described in U.S. Pat. No. 3,748,984.

The other components of the film assemblage 28 may include a dark slide 90 in overlying relation with respect to the uppermost film unit 52' thereby providing a light seal for the exposure aperture 82. In addition, there may be provided a spring member 92 compressively sandwiched between the stacked film units 52 and the bottom wall member 68 so as to urge the film units 52 toward the exposure aperture 82. Insertion of the various above-described components within the housing member 60 may be accommodated by a weakened thin foldable edge 95 between the rear wall member 64 and the trailing section 74 of the bottom wall member 68, which edge 95 permits the rear wall member 64 to be pivoted outwardly from the ends of the sidewalls 76, 78.

Figures 4, 5, 6:
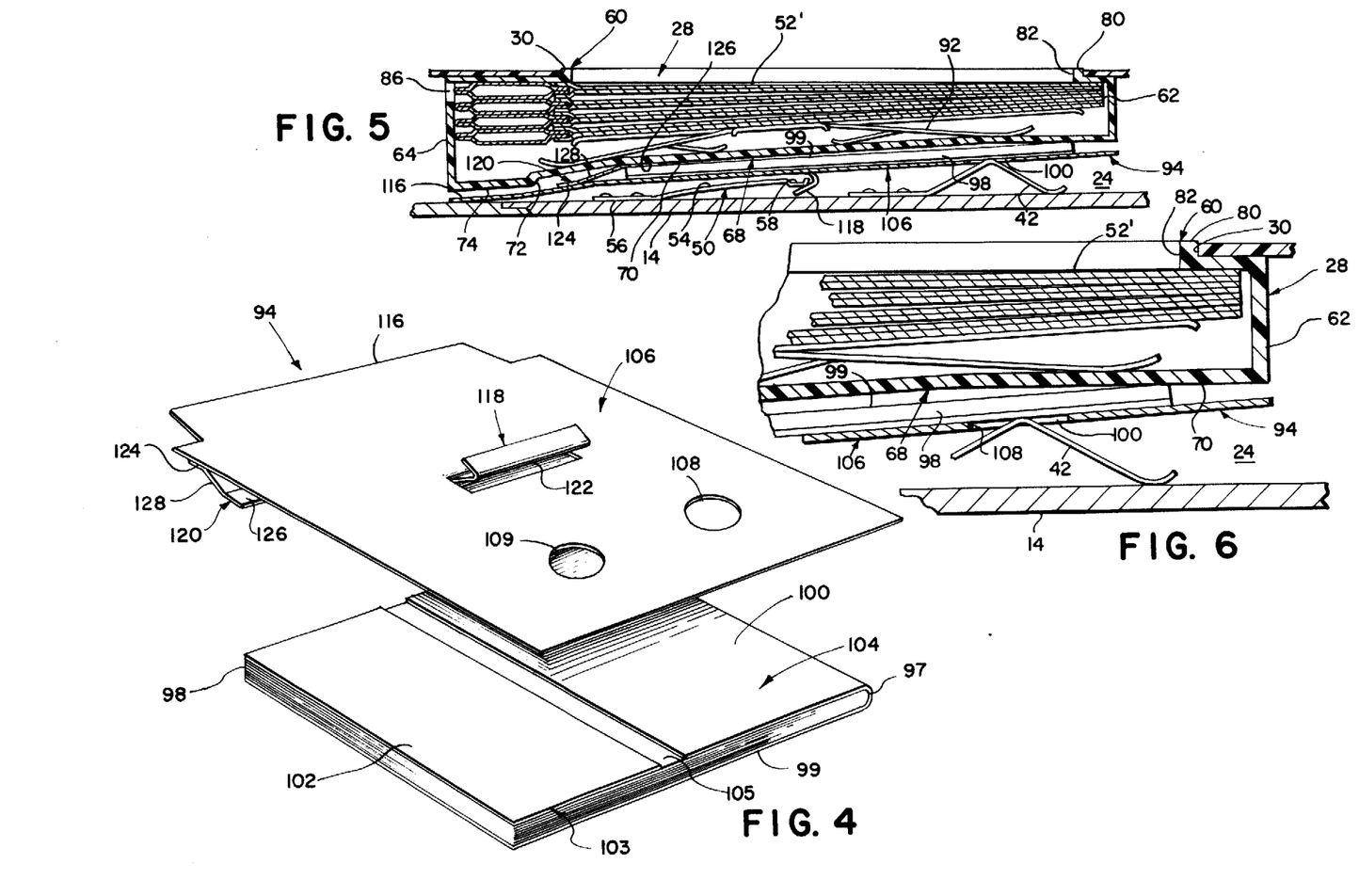
FIG. 4 is an exploded perspective view of the battery assemblage of this invention.
FIG. 5 is a cross-sectional side view of the film and battery assemblages as fully inserted in the photographic apparatus of FIG. 1.
FIG. 6 is an enlarged cross-sectional side view of a portion of FIG. 5.

Turning now to FIG. 4, there is shown in substantial detail the battery assemblage 94 which is of a thin, generally flat rectangular configuration having a laminar cell construction. The battery assemblage 94 includes a plurality of laminar layers as shown generally at 98 wherein the outside laminar layer comprises an exterior foil wrapper 104. One side of the foil wrapper 104, as shown at 99, defines an outside major surface of the battery assemblage and thereafter wraps around an edge 97 of the laminar layers 98 to overlie the opposing side thereof and define a battery terminal 100. The other battery terminal, as shown generally at 102, is defined by a foil strip 103 which substantially overlaps the remaining portion of the laminar layers not already overlapped by the foil wrapper 104. As is readily apparent, the foil strip 102 is spaced apart from the foil wrapper 104 by an intervening insulating strip 105. The battery terminals 100, 102 are of opposite polarity and either one may be made positive depending upon the particular design chosen. The foil wrapper 104 and strip 103 may additionally operate as vapor barriers to protect the film units 52 from any photographically active gases which may be emitted from the battery assemblage 94.

The outside foil wrapper 104 and strip 103 of the laminar layers 98 are bonded in juxtaposition to a non-conducting substrate as shown generally at 106. As is readily apparent, the substrate 106 is bonded in overlying relation with respect to the battery terminals 100, 102 so as to define the other outside major surface of the battery assemblage 94. The non-conducting substrate 106 may be composed of any of a variety of insulative plastic materials such as Mylar and may be permanently bonded with respect to the foil wrapper 104 and foil strip 103 by any suitable adhesive. A pair of spaced apart apertures 108, 109 are provided through the substrate 106 in substantial registration with respective battery terminals 100, 102 to accommodate the making of respective electrical connections between the electrical contacts 42, and the battery terminals 100, 102 upon insertion of the battery assemblage 94 within the film receiving chamber 24. As is readily apparent, the substrate 106 overlaps the peripheral edge of the laminar layers 98 with one integral tap portion as shown at 116 extending sufficiently beyond the peripheral edge of the laminar layers 98 to accommodate the gripping of the battery assemblage 94 without touching the laminar layers. A detent, as shown generally at 118, extends laterally outward of the substrate 106 for reasons which will be made apparent from the following discussion. Detent 118 may comprise simply a cut portion of the substrate 106 folded laterally outward of itself along a fold line as shown at 122. A strip of nonconducting material 120 may be bonded along a longitudinal edge 124 thereof to the integral tab portion 116 of the substrate 106. The strip 120 overlaps a portion of the peripheral edge of the laminar layers 98 with the other longitudinal edge thereof being bonded to the foil wrapper 104 as shown at 126. Thus, the nonconductive strip 120 operates to define a ramp surface 128, the purpose of which will become apparent from the following discussion, overlying a peripheral edge portion of the laminar layers 98.

Referring now to FIG. 2, there is shown a film and battery assemblage loading position where the housing section 32 is pivoted in a counterclockwise direction relative to the housing section 12 such that the rollers 34 and 36 are moved into a nonblocking position with respect to the open end 26 of the chamber 24. In the preferred mode of insertion, the battery assemblage 94 is first inserted into the film receiving chamber 24 by way of the unobstructed path thus provided. The battery assemblage 94 is inserted by gripping the integral tap portion 116 in a manner whereby the substrate 106 underlies the laminar layers 98. In this manner, the battery assemblage 94 may be slid into the chamber 24 in a direction approximately parallel to the outside major surfaces thereof without risk of bending the battery assemblage during the insertion process. The detent 118 will engage the cam surface section 54 of the member 50 so as to slide thereacross, subsequently settling in position adjacent the U-shaped trap section 58 upon full insertion of the battery assemblage 94 within the chamber 24. It will additionally be appreciated that full insertion of the battery assemblage 94 within the chamber 24 brings the battery terminals 100, 102 into respective electrical connection with the electrical contacts 42. Preferably, the integral tap portion 116 of the battery assemblage 94 would not be insertable beyond the open end 26 of the chamber 24, thus being readily reachable for withdrawal of the battery assemblage 94 from the chamber 24.

The film assemblage 28 may be inserted subsequent to the battery assemblage 94 in a direction approximately parallel to the outside major surfaces thereof as defined by the top and bottom wall members 66, 68. The front wall member 62 of the film assemblage 28 leads the progressive movement of the film assemblage toward the end wall 16 of chamber 24. As is now readily apparent, the front wall member 62 of the film assemblage first engages the ramped portion 128 of the non-conductive strip 120 so as to be readily slid thereover into juxtaposition with the outside foil wrapper 104 of the laminar layers 98. In this manner, inhibiting engagement of the leading front wall member 62 of the film assemblage 28 with an edge portion of the laminar layers 98 is avoided. Once the film assemblage 28 is moved over the nonconductive plastic strip 120 into overlapping relation with respect to the outside major surface 99 of the laminar layers 98, the battery assemblage 94 is thereafter progressively urged against the bias of support member 50 as a result of the progressively increasing width of the film assemblage from the front wall member 62 to the rear wall member 64. Thus, progressive movement of the film assemblage 28 over the battery assemblage 94 operates to displace the battery assemblage against the bias of member 50 so as to increase the force at the point of contact between the battery assemblage and member 50. This biasing force is thus imparted to the film assemblage 28 so as to continuously urge the film assemblage toward the plate 22. Full insertion of the film assemblage 28 within the chamber 24 results in the housing exposure aperture 82 being brought into registration with the rectangular shaped exposure opening 30 in plate 22 with the uppermost film unit 52' being urged into the exposure plane by the cooperative arrangement of the film assemblage spring member 92 and resilient member 50.

Thus, upon full film and battery assemblage insertion, it will be appreciated that the outside major surface 99 of the laminar layers 98 reside in substantial juxtaposition with respect to the recessed leading section 70 of the bottom wall member 68. The thickness of the laminar layers 98 also preferably approximates the distance at which the leading section 70 is indented with respect to the trailing section 74 while the thickness of the overlapping substrate 106 is of minor dimension in comparison with the film assemblage 28 thickness. Thus, as a result of the leading section 70 being somewhat indented with respect to the trailing section 74, it will be appreciated that the combined area occupied by the battery and film assemblages is no greater than the area otherwise occupied by a conventional film cassette of the type housing both a plurality of stacked film units together with a substantially flat battery.

Upon completion of the above-described inserting operations for the battery and film assemblages, the exposure position may be achieved by pivotally displacing housing section 32 relative to housing section 12 in a clockwise direction as shown in FIG. 1. The rollers 34 and 36 are thus moved adjacent the open end 26 of chamber 24 so that exposed film units may be individually withdrawn by the rollers 34 and 36 in a well-known manner. Upon the exposure and withdrawal of the last film unit 52, it becomes necessary to reload the camera 10 with a new film assemblage 28, however, as previously discussed, the battery assemblage 94 would have sufficient residual power to make this replacement unwarranted at this time. Thus, the camera 10 is returned to its loading position in the above-described manner after which the film assemblage 94 may be withdrawn from the open end 26 of the chamber 24 in a direction approximately parallel to the opposed major surfaces thereof. As a result of the biased engagement between the battery assemblage 94 and the film assemblage 28, there may be a tendency for the battery assemblage to withdraw in concert with the film assemblage depending upon the frictional forces therebetween. The battery assemblage 94, however, is prohibited from withdrawing simultaneously with the film assemblage 28 as a result of the detent 118 being engaged by the trap section 58 of the support member 50. Thus, individual film assemblages may be withdrawn and replaced without even handling a battery assemblage.

In the event that an individual battery assemblage 94 should have insufficient residual power to operate the camera 10, it may be withdrawn and replaced subsequent to the withdrawal of the film assemblage 28 by first grasping the integral tap portion 116 of the substrate 106 so as to move the battery assemblage in a direction approximately transverse to the major surfaces thereof until the detent 118 clears the edge of the trap section 58 of the support member 50. The battery assemblage 94 may thereafter be withdrawn through the open end 26 of the chamber 24 in a direction approximately parallel to the opposed major surfaces thereof.

Thus, it will be appreciated that the tab 116 provides a convenient means through which the battery assemblage may be gripped and lifted a sufficient distance for the detent 118 to clear the support member 50 after which the battery assemblage may be conveniently withdrawn from the chamber 24. The battery need not be withdrawn with each change in film and need only be replaced when sufficiently depleted as to be ineffectual in powering subsequent photographic operations.

While the invention has been described with respect to the details of a particular illustrative embodiment, many changes or variations will occur to those skilled to the art upon reading this description. Such can be obviously made without departing from the scope of the invention. Therefore, the embodiment herein described is illustrative and not restrictive with the scope of invention being indicated by the appended claims and all variations which come within the meaning of the claims are intended to be embraced therein.

I claim:
1. A photographic system comprising:
 means for effecting a photographic exposure, said means requiring a source of electrical energy for operation thereof and having a chamber therein defining an exposure plane and adapted for receipt of a film assemblage, the chamber additionally including electrical contacts for connecting to the source of electrical energy;

a film assemblage having opposed outside major surfaces adapted for receipt within the chamber with at least one outside major surface thereof in substantial coincidence with respect to said exposure plane, said film assemblage being readily insertable and withdrawable from said chamber;

a source of electrical energy having opposed outside major surfaces for stationing within the chamber in electrically conductive relation with respect to the electrical contacts therein wherein one outside major surface of said energy source nests in substantial juxtaposition with respect to the other major surface of said film assemblage subsequent to the insertion of said film assemblage and energy source within the chamber; and means for releasably retaining said energy source within the chamber upon insertion thereof in order to permit the independent insertion and withdrawal of said film assemblages from the chamber without simultaneously removing said energy source therefrom so that said energy source may be selectively removed from the chamber subsequent to the removal of any one of said film assemblages.

2. The photographic system of claim 1 wherein the releasable retaining means operates to inhibit withdrawal of said energy source from the chamber in any direction approximately parallel to the outside major surfaces of said energy source without first moving said energy source a predetermined distance in a direction substantially transverse to the outside major surfaces of said energy source in this manner facilitating the withdrawal of said film assemblage from the chamber without simultaneously removing said energy source so that said energy source may be selectively removed from the chamber subsequent to the removal of said film assemblage.

3. The photographic system of claim 1 wherein said source of electrical energy comprises an electrical storage battery assemblage including: a plurality of laminar layers intermediate the outside major surfaces of said energy source wherein the outside laminar layer spaced furthest apart from the juxtaposed film assemblage and energy source major surfaces defines positive and negative terminals, and a nonconductive substrate fastened in substantial juxtaposition with respect to the terminal defining laminar layer including at least one access aperture therethrough in registration with at least one of said terminals thereby facilitating respective connection between said terminals and the electrical contacts upon insertion of the battery assemblage within the chamber.

4. The photographic system of claim 3 wherein said non-conductive substrate extends beyond at least one portion of the peripheral edge of said laminar layers to accommodate gripping of the battery assemblage in a manner whereby the battery assemblage may be inserted and removed from the chamber without touching the laminar layers.

5. The photographic system of claim 4 including a strip of non-conducting material extending from fixed connection with respect to that part of the non-conducting substrate which extends beyond said edge portion of said laminar layers into overlapping relation with respect to said edge portion of said laminar layers thereby defining a ramp which accommodates the insertion of said film assemblage into the chamber subsequent to the insertion of said battery assemblage therein whereby said film assemblage may be first slid over that part of the non-conducting substrate which extends beyond said edge portion of said laminar layers and thereafter slid over said non-conducting strip so as to avoid inhibiting engagement with said edge portion of said laminar layers.

6. The photographic system of claim 3 wherein the releasable retaining means includes a detent and a projecting member, said detent member extending laterally outward of said non-conducting substrate for cooperative engagement with said projecting member which extends into the chamber from a side thereof in intercepting relation with respect to the path of insertion of said battery assemblage such that sliding insertion of said battery assemblage into the chamber in a direction approximately parallel to the major surfaces of said battery assemblage is accommodated by sliding engagement between said detent and projecting member whereby sliding withdrawal of said battery assemblage from the chamber in a direction approximately parallel to the major surfaces of said battery assemblage is accommodated only if said battery assemblage is first moved a predetermined distance in a direction substantially transverse to said battery assemblage major surfaces in order to move said detent out of potential engagement by said projecting member after which said battery assemblage may be withdrawn from the chamber in a direction approximately parallel to said battery assemblage major surfaces.

7. The photographic system of claim 1 wherein the releasable retaining means includes a detent member and a projecting member, said detent member extending laterally outward of that major surface of said energy source which is spaced apart from the juxtaposed film assemblage and energy source major surfaces, for cooperative engagement with said projecting member which extends into the chamber from a side thereof in intercepting relation with respect to the path of insertion of said energy source such that sliding insertion of said energy source into the chamber in a direction approximately parallel to the major surfaces of said energy source is accommodated by sliding engagement between said detent and projecting member whereby sliding withdrawal of said energy source from the chamber in a direction approximately parallel to the major surfaces of said energy source is accommodated only if said energy source is first moved a predetermined distance in a direction substantially transverse to said energy source major surfaces in order to move said detent out of potential engagement by said projecting member after which said energy source may be withdrawn from the chamber in a direction approximately parallel to said energy source major surfaces.

8. An electrical battery suitable for use in photographic apparatus of the type requiring a source of electrical energy for operation thereof and having a chamber adapted for receipt of the storage battery and additionally including electrical contacts for connecting the battery upon insertion thereof into the chamber, as well as a projecting member extending into the chamber from a side thereof in intercepting relation with respect to the path of insertion of said battery into the chamber, said storage battery comprising:

a plurality of laminar layers arranged to define opposed outside major surfaces on which reside positive and negative terminals; and a non-conductive substrate fastened in substantial juxtaposition with respect to at least one of said outside major surfaces and including at least one aperture therethrough to provide access to said terminals to facilitate the electrical connection between at least one battery terminal and a corresponding one of the electrical contacts upon insertion of the battery within the chamber including a detent extending laterally outward of said non-conducting substrate capable of engagement with the projecting member such that sliding insertion of said battery assemblage into the chamber in a direction approximately parallel to the major surfaces of said battery assemblage is accommodated by sliding engagement between said detent and the projecting member whereby sliding withdrawal of said battery assemblage is accommodated only if said battery assemblage is first moved a predetermined distance in a direction substantially transverse to said battery assemblage major surfaces in order to move said detent out of potential engagement by projecting member after which said battery assemblage may be withdrawn from the chamber in a direction approximately parallel to said battery assemblage major surfaces.

9. The storage battery of claim 8 wherein said detent includes a ramped portion extending obliquely outward of said non-conductive substrate whereby said ramped portion may be slid over the projecting member upon insertion of the battery assemblage within the chamber, said detent additionally including a transverse edge at the end of said ramped portion whereby said transverse edge may engage said projecting member to prohibit the withdrawal of said battery assemblage from said chamber unless said battery assemblage is first moved said predetermined distance.

10. An electrical storage battery assemblage suitable for use in photographic apparatus of the type requiring a source of electrical energy for operation thereof and having a chamber adapted for receipt of said storage battery asemblage as well as a flat film assemblage of the type having opposed outside major surfaces and containing a plurality of flat film units therein, the chamber additionally including electrical contacts for connecting to the battery upon insertion thereof, said assemblage comprising:

a generally flat electrical storage battery having opposed outside surfaces on which reside positive and negative terminals; and means for releasably retaining said battery assemblage within the chamber upon insertion thereof in order to permit the independent insertion and withdrawal of said film assemblages from the chamber without simultaneously removing said battery assemblage therefrom so that said battery assemblage may be selectively removed from the chamber in a direction proximately parallel to the major surfaces of said battery assemblage only if said battery assemblage is first moved a predetermined distance substantially transverse to said battery assemblage major surfaces subsequent to the removal of any one of said film assemblages.

11. The battery assemblage of claim 10 wherein the photographic apparatus includes a projecting member extending into the chamber from a side thereof in intercepting relation with respect to the path of insertion of said battery assemblage and wherein said releasable retaining means includes a detent extending laterally outward from an outside major surface of said battery assemblage for cooperative engagement with the projecting member such that sliding insertion of said battery assemblage into the chamber in a direction approximately parallel to the major surfaces of said battery assemblage is accommodated by sliding engagement between said detent and projecting member whereby sliding withdrawal of said battery assemblage from the chamber in a direction proximately parallel to the major surfaces of said battery assemblage is accommodated only if said battery assemblage is first moved a predetermined distance in a direction substantially transverse to said battery assemblage major surfaces in order to move said detent out of potential engagement by said projecting member after which said battery assemblage may be withdrawn from the chamber in a direction approximately parallel to said battery assemblage major surfaces.

12. The storage battery of claim 11 wherein said detent includes a ramped portion extending obliquely outward of one of said battery assemblage's major surfaces whereby said ramped portion may be slid over said projecting member upon insertion of the battery assemblage within the chamber, said detent additionally including a transverse edge at the end of said ramped portion whereby said transverse edge may engage said projecting member to prohibit the withdrawal of said battery assemblage from said chamber unless said battery assemblage is first moved said predetermined distance.

13. Film and battery apparatus suitable for use in a photographic apparatus of the type requiring a source of electrical energy for operation thereof and having a chamber adapted for receipt of said film and battery apparatus wherein the chamber additionally includes electrical contacts for connecting to the battery upon insertion thereof, said apparatus comprising:

a generally flat film assemblage including a housing having opposed outside major surfaces wherein one of the outside major surfaces defines a recessed portion, said film assemblage additionally including a plurality of generally flat film units disposed in stacked relation with respect to each other in said housing; and a generally flat electrical storage battery assemblage having opposed outside major surfaces on one of which reside positive and negative terminals wherein the area of either outside major surface is of sufficient size to at least overlie a major portion of said recessed portion of said film assemblage, said battery assemblage additionally including means for releasably retaining said battery assemblage within the chamber upon insertion thereof in order to permit the independent insertion and withdrawal of said film assemblage from the chamber without simultaneously removing said battery assemblage therefrom so that said battery assemblage may be selectively removed from the chamber subsequent to the removal of said film assemblage.

14. The film and battery apparatus of claim 13 wherein at least a portion of the battery assemblage is configured to reside in juxtaposition with respect to said recessed portion upon insertion of said film and battery apparatus within the chamber and the thickness of said juxtaposed portion of the battery assemblage approximates the thickness of said recessed portion with any other portion of the battery assemblage which resides in juxtaposition with respect to the non-recessed portion of said film assemblage being of minor dimension in comparison with the width of said film assemblage.

15. The film and battery apparatus of claim 14 wherein the battery assemblage includes:
  a plurality of laminar cell layers arranged to define opposed outside major surfaces wherein said positive and negative terminals reside on one of said outside major surfaces while the other major surface is configured to reside in juxtaposition with respect to said recessed portion upon insertion of said film and battery apparatus within the chamber; and
  a non-conductive substrate fastened in substantial juxtaposition with respect to the outside battery surface on which reside said terminals and including at least one aperture therethrough to provide access to said terminals wherein said substrate is configured to extend outward of the peripheral edge of said laminar layers and said recessed portion.

16. The film and battery apparatus of claim 13 for use with a photographic apparatus of the type including a projecting member extending into the chamber from a side thereof in intercepting relation with respect to the path of insertion of said battery assemblage and wherein said releasable retaining means includes a detent extending laterally outward from an outside major surface of said battery assemblage capable of engagement with the projecting member such that sliding insertion of said battery assemblage into the chamber in a direction approximately parallel to the major surfaces of said battery assemblage is accommodated by sliding engagement between said detent and projecting member whereby sliding withdrawal of said battery assemblage from the chamber in a direction approximately parallel to the major surfaces of said battery assemblage is accommodated only if said battery assemblage is first moved a predetermined distance in a direction substantially transverse to said battery assemblage major surfaces in order to move said detent out of potential engagment by said projecting member after which said battery assemblage may be withdrawn from the chamber in a direction approximately parallel to said battery assemblage major surfaces.

17. The battery and film apparatus of claim 16 wherein said detent includes a ramped portion extending obliquely outward of one of said battery assemblage major surfaces whereby said ramped portion may be slid over said projecting member upon insertion of the battery assemblage within the chamber, said detent additionally including a transverse edge at the end of said ramped portion whereby said transverse edge may engage said projecting member to prohibit the withdrawal of said battery assemblage from said chamber unless said battery assemblage is first moved said predetermined distance.

* * * * *